United States Patent
Shen et al.

(10) Patent No.: US 12,120,427 B1
(45) Date of Patent: Oct. 15, 2024

(54) IMAGE PROCESSING METHOD, AND PHOTOGRAPHING DEVICE

(71) Applicant: Labpano Technology (Changzhou) Co., Ltd., Jiangsu (CN)

(72) Inventors: Jingcheng Shen, Jiangsu (CN); Dawei Wu, Jiangsu (CN)

(73) Assignee: LABPANO TECHNOLOGY (CHANGZHOU) CO., LTD., Jiangsu (CN)

( * ) Notice: Subject to any disclaimer, the term of this patent is extended or adjusted under 35 U.S.C. 154(b) by 0 days.

(21) Appl. No.: 18/643,275

(22) Filed: Apr. 23, 2024

(30) Foreign Application Priority Data

Dec. 7, 2023 (CN) .......................... 202311677888.8

(51) Int. Cl.
H04N 23/68 (2023.01)

(52) U.S. Cl.
CPC ....... H04N 23/6812 (2023.01); H04N 23/683 (2023.01)

(58) Field of Classification Search
None
See application file for complete search history.

(56) References Cited

U.S. PATENT DOCUMENTS

| | | | | |
|---|---|---|---|---|
| 10,274,318 B1* | 4/2019 | Sohn | ...................... | G01C 21/08 |
| 11,847,259 B1* | 12/2023 | Zhang | ...................... | G06T 7/73 |
| 2018/0188032 A1* | 7/2018 | Ramanandan | .......... | G01S 19/52 |
| 2018/0188384 A1* | 7/2018 | Ramanandan | .......... | G01S 19/47 |
| 2020/0314340 A1* | 10/2020 | Chen | ..................... | H04N 23/698 |
| 2022/0053132 A1* | 2/2022 | Chen | ..................... | H04N 23/683 |
| 2022/0075082 A1* | 3/2022 | Kana | ....................... | G01S 19/47 |
| 2023/0134569 A1* | 5/2023 | He | ....................... | G06V 20/588 |
| | | | | 382/104 |
| 2023/0236219 A1* | 7/2023 | Zhou | ....................... | G06T 7/50 |
| | | | | 382/106 |

* cited by examiner

*Primary Examiner* — Cynthia Segura
(74) *Attorney, Agent, or Firm* — Brooks Kushman P.C.

(57) ABSTRACT

The present application relates to the field of image processing technologies, and provides an image processing method, this method is applied to a photographing device being provided with an inertial measurement unit. The method includes: obtaining first estimated data; determining second estimated data according to the first estimated data; determining a target scaling parameter matrix and a target covariance matrix; determining a Kalman filtering parameter corresponding to the specified moment according to the target scaling parameter matrix and the target covariance matrix; obtaining target posture data according to the Kalman filtering parameter corresponding to the specified moment, the second estimated data and measurement data of the inertial measurement unit; and performing a rotation processing on the image photographed by the photographing device according to a rotation matrix corresponding to the target posture data. Thus, a good anti-shake effect can be realized.

15 Claims, 1 Drawing Sheet

IMAGE PROCESSING METHOD, AND PHOTOGRAPHING DEVICE

CROSS-REFERENCE TO RELATED APPLICATION

This application claims priority to Chinese patent application No. 202311677888.8 filed with CNIPA on Dec. 7, 2023, the entire contents of which are incorporated herein by reference.

TECHNICAL FIELD

The present application pertains to the field of image processing technologies, and more particularly, to an image processing method, an image processing apparatus, and a photographing device.

BACKGROUND

In recent years, with the continuous development of science and technology, various terminal devices (e.g., photographing devices) appear in people's lives like bamboo shoots after spring rain. However, the current photographing devices still have some disadvantages to be solved urgently. For example, once a photographing device is unstable during photographing, the whole picture (image) may be shaken, and thus a photographed video is not clear, that is, a pool quality of the photographed video is caused. Therefore, the current photographing devices have an anti-shake function generally. However, the anti-shake effects of the current photographing devices are still bad.

SUMMARY

An image processing method, an image processing apparatus and a computer-readable storage medium are provided in the embodiments of the present application, and a problem that the existing photographing device has a bad anti-shake effect can be solved.

In accordance with the first aspect, an image processing method is provided in the embodiments of the present application. The image processing method is applied to a photographing device, an inertial measurement unit is provided in the photographing device. The image processing method includes: obtaining first estimated data, the first estimated data is posture data of the inertial measurement unit corresponding to a previous moment of an estimated specified moment; obtaining second estimated data according to the first estimated data, the second estimated data is estimated posture data of the inertial measurement unit corresponding to the estimated specified moment; determining a target scaling parameter matrix and a target covariance matrix, the target scaling parameter matrix is a scaling parameter matrix corresponding to a temperature value of an environment where the inertial measurement unit at the specified moment is located, and the target covariance matrix is a covariance matrix of measured noises of the inertial measurement unit, which corresponds to the temperature value of the environment where the inertial measurement unit at the specified moment is located; determining a Kalman filtering parameter corresponding to the specified moment according to the target scaling parameter matrix and the target covariance matrix; obtaining target posture data according to the Kalman filtering parameter corresponding to the specified moment, the second estimated data and measurement data of the inertial measurement unit, the target posture data represents a posterior state quantity corresponding a posture of the inertial measurement unit at the specified moment; and performing a rotation processing on the image photographed by the photographing device according to a rotation matrix corresponding to the target posture data.

In one possible implementation method of the first aspect, a first correspondence relationship and a second correspondence relationship are stored in the photographing device, the first correspondence relationship is a correspondence relationship between at least two temperature values and at least two covariance matrices of the measured noises of the inertial measurement unit, and the second correspondence relationship includes a correspondence relationship between at least two temperature values and at least two scaling parameter matrixes. Correspondingly, said determining the target scaling parameter matrix and the target covariance matrix includes: determining the target covariance matrix according to the temperature value of the environment where the inertial measurement unit at the specified moment is located and the first correspondence relationship; and determining the target scaling parameter matrix according to the temperature value of the environment where the inertial measurement unit at the specified moment is located and the second correspondence relationship.

In one possible implementation method of the first aspect, the inertial measurement unit includes a gyroscope, before the first correspondence relationship is stored in the photographing device, the image processing method further includes: obtaining, when the photographing device is in a calibration environment, multiple angular velocity measurement data corresponding to the inertial measurement unit, the photographing device is in the calibration environment refers to: the photographing device is in a specified environment temperature and is placed on a rotating platform, and the rotating platform is enabled to drive the photographing device to rotate for multiple times; integrating the multiple angular velocity measurement data to obtain a plurality of angle measurement vectors, the plurality of angle measurement vectors comprises multiple groups of first-type angle measurement vectors, various angle measurement vectors which are classified into a same group of first-type angle measurement vectors correspond to a same temperature value and correspond to a same expected rotation angle, the expected rotation angle is a set rotation angle value of the rotating platform; determining a variance of each group of the first-type angle measurement vectors; and determining the covariance matrix of the measured noises of the inertial measurement unit which corresponds to the variance of each group of the first-type angle measurement vectors, so as to obtain the first correspondence relationship.

In one possible implementation method of the first aspect, the plurality of angle measurement vectors include multiple groups of second-type angle measurement vectors, various angle measurement vectors which are classified into a same group of the second-type angle measurement vectors corresponds to the same temperature value and different expected rotation angles. Before the second correspondence relationship is stored in the photographing device, the image processing method further includes: performing steps on each group of the second-type angle measurement vectors, and the steps comprises: determining the scaling parameter matrix corresponding to the temperature value that corresponds to the second-type angle measurement vectors based on the second-type angle measurement vectors and an actual rotation angle corresponding to the various angle measurement vectors in the second-type angle measurement vectors.

In one possible implementation method of the first aspect, said determining the scaling parameter matrix corresponding to the temperature value that corresponds to the second-type angle measurement vectors based on the second-type angle measurement vectors and the actual rotation angle corresponding to the various angle measurement vectors in the second-type angle measurement vectors includes: determining, based on the second-type angle measurement vectors, the actual rotation angle corresponding to the various angle measurement vectors in the second-type angle measurement vectors and a second formula, the scaling parameter matrix corresponding to the temperature value that corresponds to the second-type angle measurement vectors, the second formula is expressed as $z_j(T_i)=(H+S(T_i))x_j(T_i)$, $1 \leq j \leq N2$, the $z_j(T_i)$ represents an angle measurement vector in the second-type angle measurement vectors, the $x_j(T_i)$ represents an actual rotation angle corresponding to the $z_j(T_i)$, and the $S(T_i)$ represents a scaling parameter matrix corresponding to $T_i$.

In one possible implementation method of the first aspect, said determining the Kalman filtering parameter corresponding to the specified moment according to the target scaling parameter matrix and the target covariance matrix includes: determining the Kalman filtering parameter corresponding to the specified moment according to the target scaling parameter matrix, the target covariance matrix, a third formula and a fourth formula, wherein the third formula is expressed as $K_k = p_k^- (H+S_K(T))^T ((H+S_K(T))p_k^- (H+S_K(T))^T + R_k(T))^{-1}$, the fourth formula is expressed as $p_k = (I - K_k (H+S_k(T))p_k^-)$; the $K_k$ represents the Kalman filtering parameter corresponding to the specified moment, the $R_k(T)$ represents the target covariance matrix, the $S_k(T)$ represents the target scaling parameter matrix, the $p_k$ represents a prior state covariance matrix evaluated at the specified moment, the $p_k$ represents a covariance matrix of an error between an actual state quantity and a posteriori estimation value of the inertial measurement unit at the specified moment, and I represents a unit matrix.

In one possible implementation method of the first aspect, said obtaining the target posture data according to the Kalman filtering parameter corresponding to the specified moment, the second estimated data and the measurement data of the inertial measurement unit includes: determining the target posture data according to the Kalman filtering parameter corresponding to the specified moment, the second estimated data, the measurement data of the inertial measurement unit, and a fifth formula, the measurement data of the inertial measurement unit includes angle measurement vectors at the specified moment, and the fifth formula is expressed as $\check{x}_k = \check{x}_k^- + K_k (z_k - (H+S_k(T)\check{x}_x^-)$; the $\check{x}_k^-$ represents the second estimated data, the $\check{x}_x$ represents the target posture data, and the $z_k$ represents the angle measurement vectors at the specified moment.

In accordance with the second aspect, a photographing device is provided in the embodiments of the present application. The photographing device includes an inertia measurement unit, a memory, a processor and a computer program stored in the memory and executable by the processor. The processor is configured to, when executing the computer program, implement any one of the methods described above.

In accordance with the third aspect, a non-transitory computer-readable storage medium is provided in the embodiments of the present application. The computer-readable storage medium stores a computer program, that, when executed by a processor of a photographing device, causes the processor of the photographing device to implement the image processing method.

It can be understood that, regarding the beneficial effects of the second aspect and the third aspect, reference can be made to relevant descriptions in the first aspect, the beneficial effects of the second aspect and the third aspect are not repeatedly described herein.

As compared to the related art, the embodiments of the present application have the following beneficial effects: The image processing method in the embodiments of the present application is applied to the photographing device, the inertial measurement unit is provided in the photographing device, the image processing method includes: obtaining the first estimated data, the first estimated data is the posture data of the inertial measurement unit corresponding to a previous moment of the estimated specified moment; obtaining the second estimated data according to the first estimated data, the second estimated data is the estimated posture data of the inertial measurement unit corresponding to the specified moment; determining the target scaling parameter matrix and the target covariance matrix, the target scaling parameter matrix is the scaling parameter matrix corresponding to the temperature value of the environment where the inertial measurement unit at the specified moment is located, and the target covariance matrix is the covariance matrix of the measured noises of the inertial measurement unit, which corresponds to the temperature value of the environment where the inertial measurement unit at the specified moment is located; determining the Kalman filtering parameter corresponding to the specified moment according to the target scaling parameter matrix and the target covariance matrix; obtaining the target posture data according to the Kalman filtering parameter corresponding to the specified moment, the second estimated data and measurement data of the inertial measurement unit, the target posture data represents a posterior state quantity corresponding to the posture of the inertial measurement unit at the specified moment. Since the target scaling parameter matrix corresponds to the temperature value of the environment where the inertial measurement unit at the specified moment is located, the target covariance matrix corresponds to the temperature value of the environment where the inertial measurement unit at the specified moment is located, that is, the Kalman filtering parameter may be determined according to the actual situation (the temperature value of the environment where the inertial measurement unit at the specified moment is located). Thus, the target posture data may be determined more accurately. Then, the photographing device performs rotation processing on the image photographed by the photographing device according to the rotation matrix corresponding to the target posture data, such that the video frame of the photographing device may be stabilized, that is, a better anti-shake effect may be realized.

BRIEF DESCRIPTION OF THE DRAWINGS

In order to describe the technical solution in the embodiments of the present application, a brief introduction regarding the accompanying drawings that need to be used for describing the embodiments or the related art is given below. It is obvious that the accompanying drawings described below are only some embodiments of the present application, for those skilled in the art, other drawings may also be obtained according to the current drawings without paying creative efforts.

DETAILED DESCRIPTION OF EMBODIMENTS

In the following descriptions, in order to describe but not intended to limit the present application, concrete details including specific system structure and technique are proposed to facilitate a comprehensive understanding of the embodiments of the present application. However, a person of ordinarily skill in the art should understand that, the present application can also be implemented in some other embodiments from which these concrete details are excluded. In other conditions, detailed explanations of method, circuit, device and system well known to the public are omitted, so that unnecessary details which disturb the description of the present application can be avoided.

It should be understood that, when a term "include" is used in the description and annexed claims, the term "include" indicates existence of the described characteristics, integer, steps, operations, elements and/or components, but not exclude existence or adding of one or more other characteristics, integer, steps, operations, elements, components and/or combination thereof.

It should be further understood that, terms "and/or" used in the description and the annexed claims of the present application are referred to as any combination of one or a plurality of listed item(s) associated with each other and all possible items, and including these combinations.

As is used in the description and the annexed claims, a term "if" may be interpreted as "when" or "once" or "in response to determination" or "in response to detection". Similarly, terms such as "if it is determined that", or "if it is detected that (a described condition or event)" may be interpreted as "once it is determined" or "in response to the determination" or "once it is detected that (the described condition or event)" or "in response to the detection (the described condition or event)".

In addition, in the descriptions of the present application, terms such as "first" and "second", "third", etc., are only used for distinguishing purpose in description, but shouldn't be interpreted as indication or implication of a relative importance.

The descriptions of "referring to one embodiment" or "referring to some embodiments", or the like as described in the specification of the present application means that a specific feature, structure, or characters which are described with reference to this embodiment are included in one embodiment or some embodiments of the present application. Thus, the sentences of "in one embodiment", "in some embodiments", "in some other embodiments", "in other embodiments", and the like in this specification are not necessarily referring to the same embodiment, but instead indicate "one or more embodiments instead of all embodiments", unless otherwise they are specially emphasize in other manner. The terms "comprising", "including", "having" and their variations mean "including but is not limited to", unless otherwise they are specially emphasized in other manner.

First Embodiment

Figure 1:
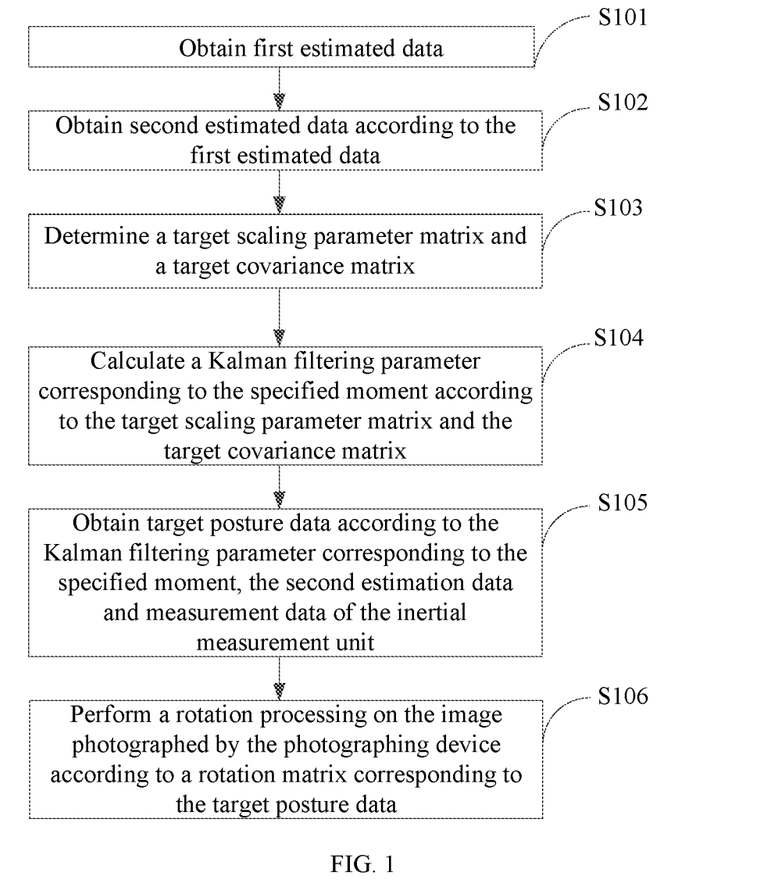
FIG. 1 is a schematic flowchart illustrating a method for image processing provided by one embodiment of the present application.

FIG. 1 is a schematic flowchart of an image processing method according to an embodiment of the present application. The image processing method is applied to a photographing device. As an example rather than a limitation, the photographing device is a panoramic camera. An inertial measurement unit is provided in the photographing device. The image processing method includes: a step S101, a step S102, a step S103, a step S104, a step S105, and a step S106, which are described below:

At the step S101, first estimated data is obtained. The first estimated data is posture data of the inertial measurement unit corresponding to a previous moment of an estimated specified moment.

The posture data of the inertial measurement unit is the data for representing a posture of the inertial measurement unit, the first estimated data may specifically be an estimated posterior state quantity corrected according to the measurement data acquired by the inertial measurement unit at the previous moment of the specified moment.

By way of example rather than limitation, the inertial measurement unit includes a gyroscope. Correspondingly, the measurement data may include angular velocity measurement data (such as a three-axis angular velocity measurement value); or/and, the inertial measurement unit includes an accelerometer, and correspondingly, the accelerometer includes acceleration measurement data (i.e., a triaxial acceleration measurement value).

At the step S102, second estimated data is obtained according to the first estimated data, the second estimated data is the estimated posture data of the inertial measurement unit corresponding to the specified moment.

The second estimated data refers to a priori estimated state quantity based on the first estimated data.

By way of example rather than limitation, the step S102 includes: determining the second estimated data according to the first estimated data and the first formula, the first formula is expressed as: $\check{x}_k^- = A\check{x}_{k-1} + Bu_{k-1}$. The $\check{x}_k^-$ represents the second estimated data, the $\check{x}_{k-1}$ represents the first estimated data, A represents a state transition parameter matrix, B represents a gain matrix, $u_{k-1}$ represents a posture (i.e., state quantity) of the inertial measurement unit corresponding to the measurement data collected by the inertial measurement unit at a previous moment of the specified moment, the specified moment may be represented as a k-th moment, K is greater than or equal to 2. Correspondingly, the previous moment of the specified moment may be represented as a (k−1)-th moment.

At the step S103, the target scaling parameter matrix and the target covariance matrix are determined. The target scaling parameter matrix is a scaling parameter matrix corresponding to a temperature value of an environment where the inertial measurement unit at the specified moment is located, and the target covariance matrix is a covariance matrix of measured noises of the inertial measurement unit, which corresponds to the temperature value of the environment where the inertial measurement unit at the specified moment is located.

The scaling parameter matrix is a scaling matrix including a plurality of parameters.

Specifically, the target scaling parameter matrix and the target covariance matrix are determined according to the temperature value of the environment where the inertial measurement unit at the specified moment is located.

Optionally, the first correspondence relationship and the second correspondence relationship are stored in the photographing device. The first correspondence relationship is a correspondence relationship between at least two temperature values and at least two covariance matrices of the measured noises of the inertial measurement unit. The second correspondence relationship includes a correspondence relationship between at least two temperature values and at least two scaling parameter matrixes. Correspondingly, said determining the target scaling parameter matrix and the target covariance matrix includes: determining the target covariance matrix according to the temperature value of the environment where the inertial measurement unit at the specified moment is located and the first correspondence relationship; determining the target scaling parameter matrix according to the temperature value of the environment where the inertial measurement unit at the specified moment is located and the second correspondence relationship.

Specifically, in the first correspondence relationship, each temperature value corresponds to one covariance matrix of the measured noises of the inertial measurement unit, and each temperature value corresponds to one scaling parameter matrix.

Optionally, the inertial measurement unit includes a gyroscope. Before the first correspondence relationship is stored in the photographing device, the image processing method includes:

When the photographing device is in a calibration environment, a plurality of angular velocity measurement data corresponding to the inertial measurement unit are obtained. The photographing device is in the calibration environment refers to: the photographing device is in a specified environment temperature and is placed on a rotating platform, and the rotating platform may drive the photographing device to rotate for multiple times;
integrating the angular velocity measurement data to obtain a plurality of angle measurement vectors, the plurality of angle measurement vectors include multiple groups of first-type angle measurement vectors, various angle measurement vectors which are classified into the same group of first-type angle measurement vectors corresponds to the same temperature value and the same expected rotation angle, the expected rotation angle is a set rotation angle value for the rotating platform, that is, an angle that the rotating platform is expected to be rotated at;
determining a variance of each group of first-type angle measurement vectors;
determining the covariance matrix of the measured noises of the inertial measurement unit, which corresponds to the variance of each group of first-type angle measurement vectors, so as to obtain the first correspondence relationship.

As an example rather than limitation, the specified ambient temperature is within an operation temperature range of the photographing device, the operation temperature range may be between −20° C. and 55° C., the specified ambient temperature may include a plurality of different temperature values. For example, the specified ambient temperature includes M uniformly spaced temperature values. The photographing device is at the specified ambient temperature includes a condition that the photographing device is at any one of the M uniformly spaced temperatures. For the convenience of description, any one of the M uniformly spaced temperature values may be represented as $T_i$ (the i-th temperature value in the M uniformly spaced temperature values), $1 \leq i < M$. A condition that the rotating platform may drive the photographing device to rotate for multiple times described herein includes: the rotating platform drives the photographing device to rotate for multiple times according to the same expected rotation angle.

When the photographing device is in the i-th temperature value ($T_i$), the rotating platform drives the photographing device to repeatedly rotate for N1 times according to the same expected rotation angle, each time the photographing device rotates once, the photographing device obtains angular velocity measurement data through the inertial measurement unit, and integrates the plurality of angular velocity measurement data to obtain an angle measurement vector (an angle represented by vector) corresponding to the angular velocity measurement data. For example, when the photographing device is at the first temperature value (e.g., 0° C.), the rotating platform drives the photographing device to repeatedly rotate for 50 times according to the same expected rotation angle, and 50 angle measurement vectors obtained at 0° C. are a group of first-type angle measurement vectors. When the photographing device is at the second temperature value (e.g., 5° C.), the rotating platform drives the photographing device to rotate for 50 times repeatedly according to the same expected rotation angle, 50 angle measurement vectors obtained at the temperature of 5° C. are another group of first type angle measurement vectors. The variances of multiple groups of the first type angle measurement vectors are calculated respectively, then, the covariance matrix of the measured noises of the inertial measurement unit, which corresponds to the variance of each group of the first-type angle measurement vectors, are determined based on the variance of each group of the first-type angle measurement vectors. Since the variance of each group of the first-type angle measurement vectors corresponds to a temperature value, therefore, the calculated covariance matrix of the measured noises of the inertial measurement unit corresponds to a temperature value, either. The covariance matrix of the measured noises of the inertial measurement unit that corresponds to the temperature value $T_i$ may be represented as $R(T_i)$.

In some embodiments, said obtaining the first correspondence relationship includes: a polynomial fitting is performed on the covariance matrix of the measured noises of the inertial measurement unit and the temperature value corresponding to the covariance matrix to obtain the first correspondence relationship. Thus, the first correspondence relationship can reflect the correspondence relationship between any temperature in the operation temperature range and the covariance matrix of the measured noises of the inertial measurement unit.

Optionally, the plurality of angle measurement vectors include multiple groups of second-type angle measurement vectors, the angle measurement vectors which are classified into the same group of the second-type angle measurement vectors correspond to the same temperature value and corresponds to different expected rotation angles. Before the second correspondence relationship is stored in the photographing device, the image processing method includes:

performing following steps on the group of the second-type angle measurement vectors: determining a scaling parameter matrix corresponding to the temperature value that corresponds to the second-type angle measurement vectors based on the second-type angle measurement vectors and the actual rotation angle corresponding to the various angle measurement vectors in the second-type angle measurement vectors.

That is, the second correspondence relationship may be obtained in this embodiment.

A condition that the rotating platform may drive the photographing device to rotate for multiple times described herein includes: the rotating platform drives the photographing device to rotate for multiple times according to different expected rotation angles.

For example, when the photographing device is at a first temperature value (e.g., 0° C.), the rotating platform drives the photographing device to rotate N2 times according to different expected rotation angles, N2 is greater than or equal to 9. Assuming that N2 is equal to 9, 9 angle measurement vectors which are obtained at 0° C. are one group of second-type angle measurement vectors. When the photographing device is at the second temperature value (e.g., 5° C.), the rotating platform drives the photographing device to rotate for 9 times according to different expected rotation angles, the 9 angle measurement vectors which are obtained at 5° C. are another group of second-type angle measurement vectors, and so on. The second-type angle measurement vectors corresponding to M temperature values are obtained respectively.

In some embodiments, said determining the scaling parameter matrix corresponding to the temperature value that corresponds to the second-type angle measurement vectors based on the second-type angle measurement vectors and the actual rotation angle corresponding to the angle measurement vectors in the second-type angle measurement vectors includes: determining the scaling parameter matrix corresponding to the temperature value that corresponds to the second-type angle measurement vectors based on the second-type angle measurement vectors, the actual rotation angle corresponding to the angle measurement vectors in the second-type angle measurement vectors, and the second formula. The second formula is expressed as $z_j(T_i)=(H+S(T_i))x_j(T_i)$, $1 \leq j \leq N2$. Where, $z_j(T_i)$ represents the angle measurement vectors in the second-type angle measurement vectors, $x_j(T_i)$ represents the actual rotation angle (vector) corresponding to $z_j(T_i)$, $S(T_i)$ represents a scaling parameter matrix corresponding to $T_i$. The actual rotation angle may be read out from the rotating table, the actual rotation angle is not necessarily equal to the expected rotation angle due to the existence of errors. H is a conversion matrix used for converting the actual state quantity (e.g., the actual rotation angle) into the angle measurement vector. For example, H is a unit matrix, when the inertial measurement unit is a three-axis inertial measurement unit, correspondingly, H is a unit matrix in the form of 3×3.

In the second formula, only $S(T_i)$ has 9 degrees of freedom. When $N2 \geq 9$, a linear equation set is formed, the linear equation set has one unique solution (or an optimal solution), then, a completely defined $S(T_i)$ may be calculated based on the linear equation set by using a linear equation set solution method including a least square method and a QR (Quadrature Rectangle) decomposition method.

$$S(T_i) := \begin{bmatrix} s_{11}(T_i) & s_{12}(T_i) & s_{13}(T_i) \\ s_{21}(T_i) & s_{22}(T_i) & s_{23}(T_i) \\ s_{31}(T_i) & s_{32}(T_i) & s_{33}(T_i) \end{bmatrix}$$

Since $S(T_i)$ is the scaling parameter matrix related to temperature, by controlling the rotating table to drive the photographing device to rotate for multiple times according to different expected rotation angles during calibration, such that different postures can be obtained, and the singularity of the equation set may be avoided.

In some embodiments, said obtaining the second correspondence relationship includes: performing a polynomial fitting on the calculated various scaling parameter matrices and the corresponding temperature values to obtain the second correspondence relationship, such that the second correspondence relationship can reflect the correspondence relationship between any temperature in the operation temperature range and the scaling parameter matrix.

At the step S104, a Kalman filtering parameter corresponding to the specified moment is obtained according to the target scaling parameter matrix and the target covariance matrix.

In some embodiments, the step S104 includes: determining the Kalman filtering parameter corresponding to the specified moment according to the target scaling parameter matrix, the target covariance matrix, a third formula and a fourth formula. The third formula is expressed as $K_k = p_k^- (H+S_K(T))^T ((H+S_K(T))p_k^- (H+S_K(T))^T + R_K(T))^{-1}$, the fourth formula is expressed as $p_k = (I - K_k (H+S_K(T))p_k^-)$. $K_k$ represents the Kalman filtering parameter corresponding to the specified moment, $R_k(T)$ represents the target covariance matrix, $S_k(T)$ represents the target scaling parameter matrix, $p_k^-$ represents a prior state covariance matrix evaluated at a k-th moment (the specified moment), $p_k$ represents a covariance matrix of an error between a real state (the actual state quantity) and a posteriori estimation value of the inertial measurement unit at the specified moment, I is a unit matrix.

At the step S105, the target posture data is obtained according to the Kalman filtering parameter corresponding to the specified moment, the second estimated data and measurement data of the inertial measurement unit. The target posture data represents a posterior state quantity corresponding to the posture of the inertial measurement unit corresponding to the specified moment.

In some embodiments, the step S105 includes: determining the target posture data according to the Kalman filtering parameter corresponding to the specified moment, the second estimated data, the measurement data of the inertial measurement unit, and a fifth formula. The measurement data of the inertial measurement unit includes the angle measurement vectors at the specified moment. the fifth formula is expressed as $\check{x}_k = \check{x}_k^- + K_k (z_k - (H+S_k(T))\check{x}_k^-)$; $\check{x}_k^-$ represents the second estimated data, $\check{x}_k$ represents the target posture data; and $z_k$ represents the angle measurement vectors corresponding to the specified moment.

At the step S106, a rotation processing is performed on the image photographed by the photographing device according to the rotation matrix corresponding to the target posture data.

Specifically, the target posture data is converted into the rotation matrix, and the rotation processing is performed on the image photographed by the photographing device according to the rotation matrix. For example, the rotation processing is performed on the image photographed by the photographing device at the specified moment according to the rotation matrix, such that the video frame of the photographing device can be stable, that is, a better anti-shake effect can be achieved.

The image processing method in the embodiments of the present application is applied to the photographing device, the inertial measurement unit is provided in the photographing device, and the image processing method includes: obtaining the first estimated data, the first estimated data is the posture data of the inertial measurement unit corresponding to a previous moment of the estimated specified moment; obtaining the second estimated data according to the first estimated data, the second estimated data is the estimated posture data of the inertial measurement unit corresponding to the specified moment; determining the target scaling parameter matrix and the target covariance matrix, the target scaling parameter matrix is the scaling parameter matrix corresponding to the temperature value of the environment where the inertial measurement unit at the specified moment is located, and the target covariance matrix is the covariance matrix of the measured noises of the inertial measurement unit, which corresponds to the temperature value of the environment where the inertial measurement unit at the specified moment is located; determining the Kalman filtering parameter corresponding to the specified moment according to the target scaling parameter matrix and the target covariance matrix; obtaining the target posture data according to the Kalman filtering parameter corresponding to the specified moment, the second estimated data and the measurement data of the inertial measurement unit, the target posture data represents a posterior state quantity corresponding to the posture of the inertial measurement unit at the specified moment. Since the target scaling parameter matrix corresponds to the temperature value of the environment where the inertial measurement unit at the specified moment is located, the target covariance matrix corresponds to the temperature value of the environment where the inertial measurement unit at the specified moment is located, that is, the Kalman filtering parameter may be determined according to the actual situation (the temperature value of the environment where the inertial measurement unit at the specified moment is located). Thus, the target posture data may be determined more accurately. Then, the photographing device performs rotation processing on the image photographed by the photographing device according to the rotation matrix corresponding to the target posture data, such that the video frame of the photographing device may be stabilized, that is, a better anti-shake effect may be realized.

It should be understood that, the values of serial numbers of the steps in the aforesaid embodiments do not indicate an order of execution sequences of the steps. Instead, the execution sequences of the steps should be determined by functionalities and internal logic of the steps, and thus shouldn't be regarded as limitation to implementation processes of the embodiments of the present application.

Second Embodiment

Figure 2:
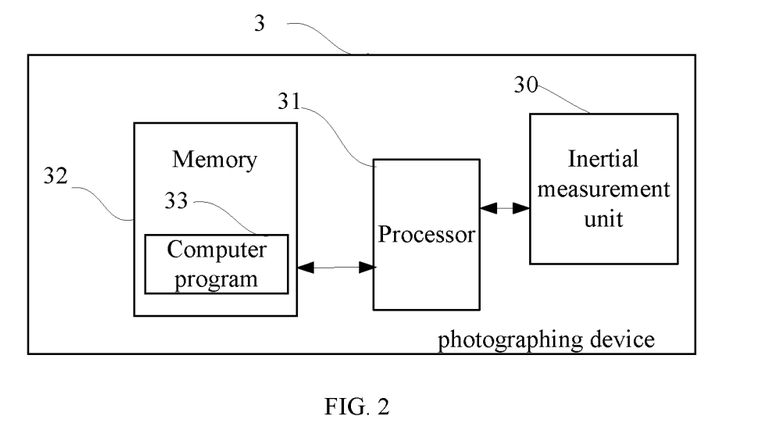
FIG. 2 is a schematic diagram of a photographing device provided by one embodiment of the present application.

A photographing device 3 in this embodiment includes an inertia measurement unit 30, at least one processor 31, a memory 32 and a computer program 33 stored in the memory 32 and executable by the at least one processor 31. The processor 31 is configured to, when executing the computer program 33, implement the steps in any one of embodiments of the image processing method.

The processor 31 is configured to, when executing the computer program 33, implement the steps in the aforesaid various image processing method embodiments, such as the steps S101-S106 shown in FIG. 1. As an example rather than limitation, the photographing device may be a panorama camera.

A person of ordinary skill in the art can understand that, this embodiment is only one example of the photographing device 3, but should not be constituted as limitation to the photographing device 3, more or less components than the components shown in FIG. 2 may be included. As an alternative, some components or different components may be combined; for example, the photographing device 3 may also include an input and output device, a network access device, etc.

The so-called processor 31 may be central processing unit (CPU), and can also be other general purpose processor, digital signal processor (DSP), application specific integrated circuit (ASIC), field-programmable gate array (FGPA), or some other programmable logic devices, discrete gate or transistor logic device, discrete hardware component, etc. The general purpose processor may be a microprocessor, as an alternative, the processor can also be any conventional processor, or the like.

In some embodiments, the memory 32 may be an internal storage unit of the photographing device 3, such as a hard disk or a memory of the photographing device 3. In some embodiments, the memory 32 may also be an external storage device of the photographing device 3, such as a plug-in hard disk, a SMC (Smart Media Card), a SD (Secure Digital) card, a FC (Flash Card) equipped on the photographing device 3. Furthermore, the memory 32 may not only include the internal storage unit of the photographing device 3, but also include the external memory of the photographing device 3. The memory 32 is configured to store an operating system, an application program, a BootLoader, data and other programs, such as the program codes of the computer program 33. The memory 32 may also be configured to store data that has been output or being ready to be output temporarily.

A non-transitory computer-readable storage medium is further provided in one embodiment of the present application. The non-transitory computer-readable storage medium stores a computer program 33, that, when executed by the processor 31, causes the processor 31 to implement the steps in the aforesaid various method embodiments.

A computer program product is further provided in one embodiment of the present application. When the computer program product is executed by the photographing device 3, the photographing device 3 is caused to implement the steps in the various method embodiments.

In the embodiments of the present application, the descriptions of the embodiments in the present application are emphasized respectively. Regarding the part in some embodiments which is not described in detail, reference can be made to related descriptions in other embodiments.

The person of ordinary skill in the art may understand that, the elements and algorithm steps of each of the examples described in connection with the embodiments disclosed herein may be implemented in electronic hardware, or in combination with computer software and electronic hardware. Whether these functions are implemented by hardware or software depends on the specific application and design constraints of the technical solution. The skilled people could use different methods to implement the described functions for each particular application, however, such implementations should not be considered as going beyond the scope of the present application.

In some embodiments provided by the present application, it should be understood that the disclosed apparatus/network device and the method may be achieved in other manners. For example, the aforementioned apparatus embodiments/network device embodiments are illustrative merely. For example, the division of the aforementioned modules/units is just a logic function division manner, some other divisions may be used in actual implementations. For example, a plurality of units or components may be combined or integrated into another system, or some features may be ignored or unexecuted. Another point, the interacted coupling or directly coupling or communication connection displayed or discussed may be indirect coupling or communication connection via some ports, apparatus or units, and the form of the connection may be electrical, mechanical, or other types.

The foregoing embodiments are only intended to explain the technical solutions of the present application, rather than limiting the technical solutions of the present application.

Although the present application has been described in detail with reference to these embodiments, a person of ordinary skilled in the art should understand that, the technical solutions disclosed in the embodiments may also be amended, some technical features in the technical solutions may also be equivalently replaced. The amendments or the equivalent replacements don't cause the essence of the corresponding technical solutions to be deviated from the spirit and the scope of the technical solutions in the embodiments of the present application, and thus should all be included in the protection scope of the present application.

What is claimed is:

1. An image processing method implemented by a photographing device, wherein an inertial measurement unit is provided in the photographing device, and the image processing method comprises:
    obtaining first estimated data, wherein the first estimated data is posture data of the inertial measurement unit corresponding to a previous moment of an estimated specified moment;
    obtaining second estimated data according to the first estimated data, wherein the second estimated data is estimated posture data of the inertial measurement unit corresponding to the estimated specified moment;
    determining a target scaling parameter matrix and a target covariance matrix, wherein the target scaling parameter matrix is a scaling parameter matrix corresponding to a temperature value of an environment where the inertial measurement unit at the specified moment is located, and the target covariance matrix is a covariance matrix of measured noises of the inertial measurement unit, which corresponds to the temperature value of the environment where the inertial measurement unit at the specified moment is located;
    determining a Kalman filtering parameter corresponding to the specified moment according to the target scaling parameter matrix and the target covariance matrix;
    obtaining target posture data according to the Kalman filtering parameter corresponding to the specified moment, the second estimated data and measurement data of the inertial measurement unit, wherein the target posture data represents a posterior state quantity corresponding a posture of the inertial measurement unit at the specified moment; and
    performing a rotation processing on the image photographed by the photographing device according to a rotation matrix corresponding to the target posture data.

2. The image processing method according to claim 1, wherein a first correspondence relationship and a second correspondence relationship are stored in the photographing device, wherein the first correspondence relationship is a correspondence relationship between at least two temperature values and at least two covariance matrices of the measured noises of the inertial measurement unit, and the second correspondence relationship comprises a correspondence relationship between at least two temperature values and at least two scaling parameter matrixes; correspondingly, said determining the target scaling parameter matrix and the target covariance matrix comprises:
    determining the target covariance matrix according to the temperature value of the environment where the inertial measurement unit at the specified moment is located and the first correspondence relationship; and
    determining the target scaling parameter matrix according to the temperature value of the environment where the inertial measurement unit at the specified moment is located and the second correspondence relationship.

3. The image processing method according to claim 2, wherein the inertial measurement unit comprises a gyroscope, before the first correspondence relationship is stored in the photographing device, the image processing method further comprises:
    obtaining, when the photographing device is in a calibration environment, multiple angular velocity measurement data corresponding to the inertial measurement unit, wherein the photographing device is in the calibration environment refers to: the photographing device is in a specified environment temperature and is placed on a rotating platform, and the rotating platform is enabled to drive the photographing device to rotate for multiple times;
    integrating the multiple angular velocity measurement data to obtain a plurality of angle measurement vectors, wherein the plurality of angle measurement vectors comprises multiple groups of first-type angle measurement vectors, various angle measurement vectors which are classified into a same group of first-type angle measurement vectors correspond to a same temperature value and correspond to a same expected rotation angle, the expected rotation angle is a set rotation angle value of the rotating platform;
    determining a variance of each group of the first-type angle measurement vectors; and
    determining the covariance matrix of the measured noises of the inertial measurement unit which corresponds to the variance of each group of the first-type angle measurement vectors, so as to obtain the first correspondence relationship.

4. The image processing method according to claim 3, wherein the plurality of angle measurement vectors comprise multiple groups of second-type angle measurement vectors, various angle measurement vectors which are classified into a same group of the second-type angle measurement vectors corresponds to the same temperature value and different expected rotation angles, before the second correspondence relationship is stored in the photographing device, the image processing method further comprises:
    performing steps on each group of the second-type angle measurement vectors, and the steps comprises:
    determining the scaling parameter matrix corresponding to the temperature value that corresponds to the second-type angle measurement vectors based on the second-type angle measurement vectors and an actual rotation angle corresponding to the various angle measurement vectors in the second-type angle measurement vectors.

5. The image processing method according to claim 4, wherein said determining the scaling parameter matrix corresponding to the temperature value that corresponds to the second-type angle measurement vectors based on the second-type angle measurement vectors and the actual rotation angle corresponding to the various angle measurement vectors in the second-type angle measurement vectors comprises:
    determining, based on the second-type angle measurement vectors, the actual rotation angle corresponding to the various angle measurement vectors in the second-type angle measurement vectors and a second formula, the scaling parameter matrix corresponding to the temperature value that corresponds to the second-type angle measurement vectors, wherein the second formula is expressed as: $z_j(T_i)=(H+S(T_i))x_j(T_i)$, $1 \leq j \leq N2$, wherein the $z_j(T_i)$ represents an angle measurement vector in the second-type angle measurement vectors, the $x_j(T_i)$ represents an actual rotation angle corresponding to the $z_j(T_i)$, and the $S(T_i)$ represents a scaling parameter matrix corresponding to $T_i$.

6. The image processing method according to claim 1, wherein said determining the Kalman filtering parameter corresponding to the specified moment according to the target scaling parameter matrix and the target covariance matrix comprises:

determining the Kalman filtering parameter corresponding to the specified moment according to the target scaling parameter matrix, the target covariance matrix, a third formula and a fourth formula, wherein the third formula is expressed as $K_k = p_k^- (H+S_K(T))^T ((H+S_K(T)) p_k^- (H+S_K(T))^T + R_K(T))^{-1}$, the fourth formula is expressed as $p_k = (I - K_k (H+S_K(T)) p_k^-)$; wherein the $K_k$ represents the Kalman filtering parameter corresponding to the specified moment, the $R_k(T)$ represents the target covariance matrix, the $S_k(T)$ represents the target scaling parameter matrix, the $p_k^-$ represents a prior state covariance matrix evaluated at the specified moment, the $p_k$ represents a covariance matrix of an error between an actual state quantity and a posteriori estimation value of the inertial measurement unit at the specified moment, and I represents a unit matrix.

7. The image processing method according to claim 6, wherein said obtaining the target posture data according to the Kalman filtering parameter corresponding to the specified moment, the second estimated data and the measurement data of the inertial measurement unit comprises:

determining the target posture data according to the Kalman filtering parameter corresponding to the specified moment, the second estimated data, the measurement data of the inertial measurement unit, and a fifth formula, wherein the measurement data of the inertial measurement unit comprises angle measurement vectors at the specified moment, and the fifth formula is expressed as $\check{x}_k = \check{x}_k^- + K_k (z_k - (H+S_K(T)) \check{x}_k^-)$; wherein the $\check{x}_k^-$ represents the second estimated data, the $\check{x}_k$ represents the target posture data, and the $z_k$ represents the angle measurement vectors at the specified moment.

8. A non-transitory computer-readable storage medium, which stores a computer program, that, when executed by a processor of a photographing device, causes the processor of the photographing device to implement the image processing method according to claim 1.

9. A photographing device, comprising an inertia measurement unit, a memory, a processor and a computer program stored in the memory and executable by the processor, wherein the processor is configured to, when executing the computer program, implement an image processing method, comprising:

obtaining first estimated data, wherein the first estimated data is posture data of the inertial measurement unit corresponding to a previous moment of an estimated specified moment;

obtaining second estimated data according to the first estimated data, wherein the second estimated data is estimated posture data of the inertial measurement unit corresponding to the estimated specified moment;

determining a target scaling parameter matrix and a target covariance matrix, wherein the target scaling parameter matrix is a scaling parameter matrix corresponding to a temperature value of an environment where the inertial measurement unit at the specified moment is located, and the target covariance matrix is a covariance matrix of measured noises of the inertial measurement unit, which corresponds to the temperature value of the environment where the inertial measurement unit at the specified moment is located;

determining a Kalman filtering parameter corresponding to the specified moment according to the target scaling parameter matrix and the target covariance matrix;

obtaining target posture data according to the Kalman filtering parameter corresponding to the specified moment, the second estimated data and measurement data of the inertial measurement unit, wherein the target posture data represents a posterior state quantity corresponding a posture of the inertial measurement unit at the specified moment; and performing a rotation processing on the image photographed by the photographing device according to a rotation matrix corresponding to the target posture data.

10. The photographing device according to claim 9, wherein a first correspondence relationship and a second correspondence relationship are stored in the photographing device, wherein the first correspondence relationship is a correspondence relationship between at least two temperature values and at least two covariance matrices of the measured noises of the inertial measurement unit, and the second correspondence relationship comprises a correspondence relationship between at least two temperature values and at least two scaling parameter matrixes; the processor is further configured to determine the target scaling parameter matrix and the target covariance matrix by:

determining the target covariance matrix according to the temperature value of the environment where the inertial measurement unit at the specified moment is located and the first correspondence relationship; and determining the target scaling parameter matrix according to the temperature value of the environment where the inertial measurement unit at the specified moment is located and the second correspondence relationship.

11. The photographing device according to claim 10, wherein the inertial measurement unit comprises a gyroscope, before the first correspondence relationship is stored in the photographing device, the processor is further configured to:

obtain, when the photographing device is in a calibration environment, multiple angular velocity measurement data corresponding to the inertial measurement unit, wherein the photographing device is in the calibration environment refers to: the photographing device is in a specified environment temperature and is placed on a rotating platform, and the rotating platform is enabled to drive the photographing device to rotate for multiple times;

integrate the multiple angular velocity measurement data to obtain a plurality of angle measurement vectors, wherein the plurality of angle measurement vectors comprises multiple groups of first-type angle measurement vectors, various angle measurement vectors which are classified into a same group of first-type angle measurement vectors correspond to a same temperature value and correspond to a same expected rotation angle, the expected rotation angle is a set rotation angle value of the rotating platform;

determine a variance of each group of the first-type angle measurement vectors; and determine the covariance matrix of the measured noises of the inertial measurement unit which corresponds to the variance of each group of the first-type angle measurement vectors, so as to obtain the first correspondence relationship.

12. The photographing device according to claim 11, wherein the plurality of angle measurement vectors comprise multiple groups of second-type angle measurement vectors, various angle measurement vectors which are classified into a same group of the second-type angle measurement vectors corresponds to the same temperature value and different expected rotation angles, before the second correspondence relationship is stored in the photographing device, the processor is further configured to:
  determine the scaling parameter matrix corresponding to the temperature value based on the second-type angle measurement vectors and an actual rotation angle corresponding to the various angle measurement vectors in the second-type angle measurement vectors, wherein the temperature value corresponds to the second-type angle measurement vectors.

13. The photographing device according to claim 12, wherein the processor is configured to determine the scaling parameter matrix corresponding to the temperature value based on the second-type angle measurement vectors and the actual rotation angle corresponding to the various angle measurement vectors in the second-type angle measurement vectors by:
  determining, based on the second-type angle measurement vectors, the actual rotation angle corresponding to the various angle measurement vectors in the second-type angle measurement vectors and a second formula, the scaling parameter matrix corresponding to the temperature value that corresponds to the second-type angle measurement vectors, wherein the second formula is expressed as $z_j(T_i)=(H+S(T_i))x_j(T_i)$, $1 \leq j \leq N2$; wherein the $z_j(T_i)$ represents an angle measurement vector in the second-type angle measurement vectors, the $x_j(T_i)$ represents an actual rotation angle corresponding to the $z_j(T_i)$, and the $S(T_i)$ represents a scaling parameter matrix corresponding to $T_i$.

14. The photographing device according to claim 8, wherein the processor is configured to determine the Kalman filtering parameter corresponding to the specified moment according to the target scaling parameter matrix and the target covariance matrix by:
  determining the Kalman filtering parameter corresponding to the specified moment according to the target scaling parameter matrix, the target covariance matrix, a third formula and a fourth formula; wherein the third formula is expressed as $K_k = p_k^-(H+S_K(T))^T((H+S_K(T))p_k^-(H+S_K(T))^T+R_K(T))^{-1}$, the fourth formula is expressed as $p_k=(I-K_k(H+S_K(T))p_k^-)$; wherein the $K_k$ represents the Kalman filtering parameter corresponding to the specified moment, the $R_k(T)$ represents the target covariance matrix, the $S_k(T)$ represents the target scaling parameter matrix, the $p_k^-$ represents a prior state covariance matrix evaluated at the specified moment, the $p_k$ represents a covariance matrix of an error between an actual state quantity and a posteriori estimation value of the inertial measurement unit at the specified moment, and I represents a unit matrix.

15. The photographing device according to claim 14, wherein the processor is configured to obtain the target posture data according to the Kalman filtering parameter corresponding to the specified moment, the second estimated data and the measurement data of the inertial measurement unit by:
  determining the target posture data according to the Kalman filtering parameter corresponding to the specified moment, the second estimated data, the measurement data of the inertial measurement unit, and a fifth formula; wherein the measurement data of the inertial measurement unit comprises angle measurement vectors at the specified moment, and the fifth formula is expressed as $\check{x}_k = \check{x}_k^- + K_k(z_k - (H+S_K(T))\check{x}_k^-)$, wherein the $\check{x}_k^-$ represents the second estimated data, the $\check{x}_k$ represents the target posture data, and the $z_k$ represents the angle measurement vectors at the specified moment.

* * * * *